(12) United States Patent
Gebhardt, Jr. et al.

(10) Patent No.: US 7,082,135 B2
(45) Date of Patent: Jul. 25, 2006

(54) EXTENDABLE SLOT ADDRESSING SYSTEM AND METHOD

(75) Inventors: Ronald L. Gebhardt, Jr., Delran, NJ (US); Craig G. Martin, Chalfont, PA (US); Mark M. Morehouse, Doylestown, PA (US)

(73) Assignee: General Instrument Corporation, Horsham, PA (US)

( * ) Notice: Subject to any disclaimer, the term of this patent is extended or adjusted under 35 U.S.C. 154(b) by 1069 days.

(21) Appl. No.: 10/067,026

(22) Filed: Feb. 4, 2002

(65) Prior Publication Data

US 2003/0147354 A1    Aug. 7, 2003

(51) Int. Cl.
*H04L 12/28* (2006.01)
(52) U.S. Cl. .................. 370/393; 370/408; 370/409
(58) Field of Classification Search ............. 370/389, 370/392–393, 408–409, 475
See application file for complete search history.

(56) References Cited

U.S. PATENT DOCUMENTS

| | | | |
|---|---|---|---|
| 5,394,556 A * | 2/1995 | Oprescu | ............... 709/220 |
| 5,673,263 A | 9/1997 | Basso et al. | |
| 6,058,421 A | 5/2000 | Fijolek et al. | |
| 6,272,129 B1 | 8/2001 | Dynarski et al. | |
| 6,442,171 B1 * | 8/2002 | Lee et al. | ............... 370/408 |

* cited by examiner

*Primary Examiner*—Hanh Nguyen
*Assistant Examiner*—Thai Hoang
(74) *Attorney, Agent, or Firm*—Lawrence T. Cullen

(57) ABSTRACT

A method of expandable network slot addressing to provide topological information for a network. The method includes providing a platform having addressable slots for data communication. A first tier device is located in one of the slots in the platform. At least one second tier device is connected to the first tier device. An extendable address is assigned to each of the first and second tier devices, with each address including a slot address segment which indicates which slot each of the devices resides in or is connected to at the modular platform, a depth segment which indicates a layer in the topology at which the device is located and a number of address bytes that are present, and an address byte segment which indicates where in the topology the device is located and provides each of the devices with a unique address so that each of the devices attached to the platform can be addressed and its topological position can be inferred from the address.

10 Claims, 1 Drawing Sheet

EXTENDABLE SLOT ADDRESSING SYSTEM AND METHOD

BACKGROUND OF THE INVENTION

1. Field of the Invention

The present invention involves an addressing system for communication within computer networks. More specifically, the invention relates to a method and system for expandable addressing of devices or modules connected to a network to provide topological information for the network.

2. Background Information

Cable systems were originally uni-directional, supporting only a downstream data path, such as from a headend modular platform for the cable system. Data is routed in packets through the hubs and Nodes to the end user location, where it is received by the customer cable box or cable modem. In some instances bi-directional communication is available directly through the cable system in which communication from the customer to the headend modular platform is directly available using an assigned portion of the bandwidth. In other systems, it is necessary to provide a return path via a telephony network to the headend modular platform.

Regardless of the type of cable system used, it is necessary to assign addresses to each device or module connected to the network in order to ensure that the data packets are correctly routed and decoded by the user end device having the correct address and authorization. Most known forms of addressing are not flexible, and the number of layers or junctions that may be addressed is fixed to a maximum number. Additionally, most fixed addressing schemes do not provide any correlation between the structure of the connections in the network and the address.

It would be desirable to provide an addressing system for a network that can be expanded as additional elements are added to the system and which also provides a correlation between the structure of connections in the network and the addresses. It would also be desirable to allow status monitoring of the return path over the network through a headend platform utilizing the cable system, which can readily provide information on where in the system any problems have occurred.

SUMMARY

Briefly stated, the present invention provides a method of expandable network slot addressing to provide topological information for a network. The method includes providing a platform having addressable slots for data communication. A first tier device is located in one of the slots in the platform. At least one second tier device is connected to the first tier device. An extendable address is assigned to each of the first and second tier devices, and preferably to any additional tiers in the system, with each address including a slot address segment which indicates which slot each of the devices resides in or is connected to at the modular platform, a depth segment which indicates a layer in the topology at which the device is located and a number of address bytes that are present, and an address byte segment which indicates where in the topology the device is located and provides each of the devices with a unique address so that each of the devices attached to the platform can be addressed and its topological position can be inferred from the address.

BRIEF DESCRIPTION OF THE DRAWINGS

The present invention will hereinafter be described in conjunction with the appended drawing figures, wherein like numerals denote like elements, and.

DETAILED DESCRIPTION OF THE PREFERRED EMBODIMENT(S)

The ensuing detailed description provides preferred exemplary embodiments only, and is not intended to limit the scope, applicability, or configuration of the invention. Rather, the ensuing detailed description of the preferred exemplary embodiment(s) will provide those skilled in the art with an enabling description for implementing a preferred exemplary embodiment of the invention. It being understood that various changes may be made in the function and arrangement of system without departing from the spirit and scope of the invention as set forth in the appended claims.

Figure 1:
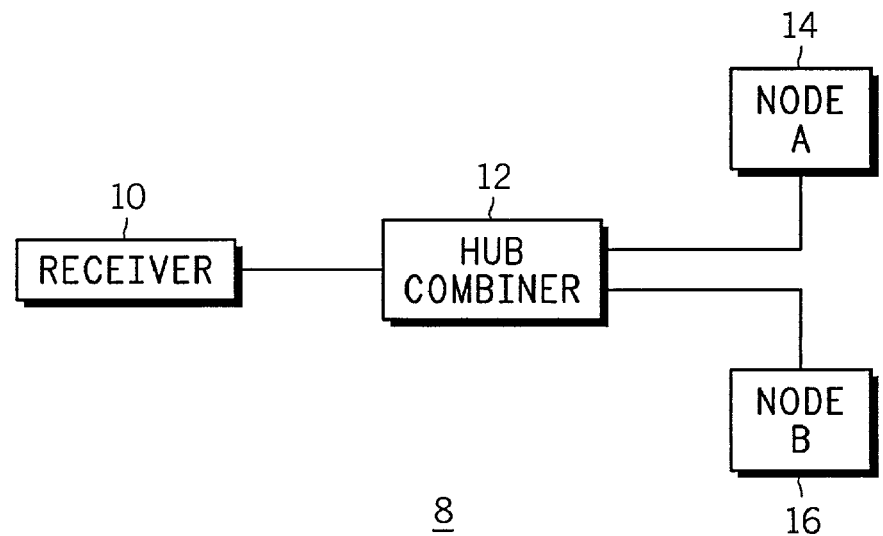
FIG. 1 is a block diagram of a portion of a network system to which the extendable slot addressing of the present invention can be applied.

FIG. 1 shows a portion of a network system 8, such as an HFC cable network which can be used in connection with a modular platform such as the OmniStar GX2 broad band cable-optic platform, which is available from Motorola, Inc. The modular platform includes slots which may be connected to receivers, hubs, other modules, or other devices or elements in the cable-optic network. In the portion of the network shown in FIG. 1, a return path receiver 10 is connected in slot 5 of the modular platform. The receiver 10 is connected to a hub combiner-device 12 that is in turn connected to Node A 14 and Node B 16.

Addresses are assigned by each device in the topology, and any device that receives status information from another device will assign an address to it. In order to construct an address, the following Rules are applied:

1. Addresses are assigned per device or element and not per port.

2. Address enumeration of attached devices begins with the lowest numbered port (i.e., 1, 2, 3 . . . or "A" or "B" or "C". . . )

3. Address enumeration of a multi-sided device always begins with side A (or equivalent). Side A is enumerated as "1", side B is enumerated as "2", side C is enumerated as "3", and so on. A non-multi sided device always enumerates itself as "1".

To the extent that addresses may be assigned by each device in the topology that receives status information from another device, the addresses are relative, and not absolute. An address assigned to a device depends on the relationship between the addressor and the addressee. In FIG. 1, the upstream receiver 10 resides in SLOT 5 of the headend modular platform and is a first tier device. The hub combiner 12 would be considered a second tier device, and the Nodes 14, 16 would be third tier devices. The extendable addresses are assigned to the first, second, and third tier devices, as well as fourth tier and further devices, which could be subscriber cable modems in an HFC network.

The extendable addresses are definable by a series of bytes, and can be represented as <address byte><depth><address byte 1>. . . <address byte n>, where n is equal to a depth value. The extendable slot address byte, the depth byte and the address bytes never have a value of zero. However, this could be possibly used in the future, for example, as a stop byte.

Using these rules, the receiver 10 would be assigned an address from the modular platform which can be represented as SLOT.1, where the slot is 5, the depth is 1, and the address is 1 for a single sided device, which results in an address of 0x511. The hub 12 would be assigned an address from the modular platform which is represented as SLOT.1.1, where the slot is still 5, the depth is 2 for the second tier device, and the address bytes are 1 and 1, which results in an address of 0x5211. Node A 14 is represented as SLOT.1.1.1, where the slot remains 5, the depth is now 3, and the address bytes are 1 (for the receiver 10), 1 (for the hub combiner 12), and 1 (for Node A 14 being attached to the first port of the hub combiner 12), which results in an address of 0x53111. Node B 16 is represented as SLOT.1.1.2, which would result in an address of 0x53112, since Node B is connected in the second port of the hub combiner 12.

If the receiver 10 was provided as a dual sided module, then side A would be represented as SLOT.1, as noted above. Side B would be represented as SLOT.2 or 0x512.

Using the address system in accordance with the invention, it is possible for each device 12, 14, 16 to communicate with the headend receiver 10 to status monitor the devices 12, 14, 16 from the headend. Additionally, based upon the addressing system provided, it is possible to deduce the network topology to manage the network, in contrast to the prior known systems where manual operator action was required to associate fixed addresses to a defined topology. For example, if there was a problem with Node A in the portion of the system shown in FIG. 1, its location in the network topology could be deduced based on its headend address of 0x53111, which identifies Node A as having a depth level of 3 with respect to SLOT 5 of the headend modular platform mounted receiver 10 and the first port of the second tier device, the hub-combiner 12.

Figure 2:
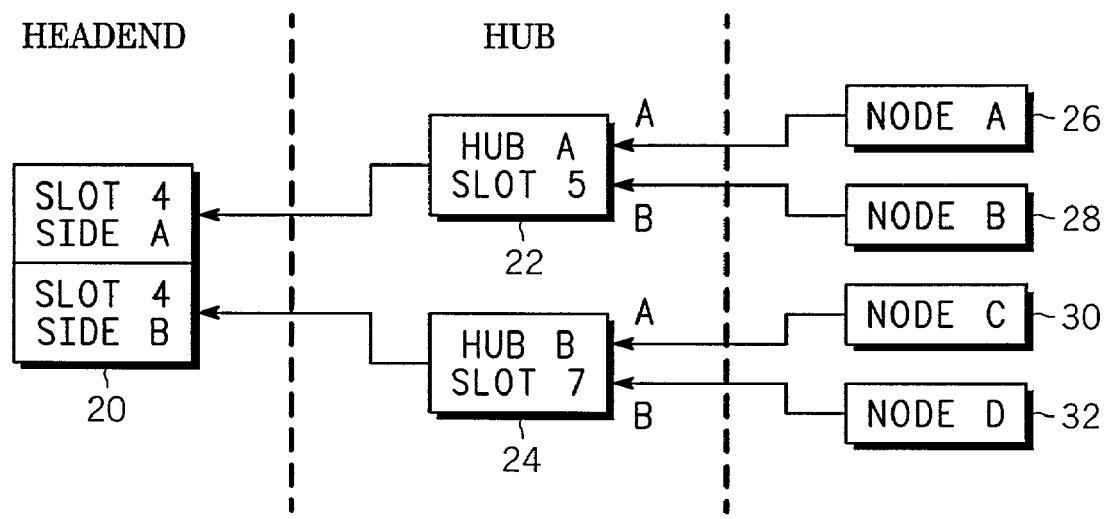
FIG. 2 is a block diagram of a portion of a second embodiment of a network system to which the expandable network slot addressing system of the present invention can be applied.

Referring to FIG. 2, a second example of a portion of a HFC cable network system 18 is shown. In this example, a dual-sided return path receiver 20 is located in SLOT 4 of a headend modular platform, for example such as an Omni-Star Gx2 shelf, and is connected to hub combiners A and B 22, 24. For the purposes of this example, hub combiner A 22 is located in SLOT 5 and hub combiner B 24 is located in SLOT 7 of a shelf for the hub combiners 22, 24. Each hub combiner 22, 24 has two nodes connected to it. Node A 26 is connected to side A of hub combiner A 22, and Node B 28 is connected to side B of hub combiner A 22. Node C 30 is connected to side A of hub combiner B 24 and Node D 32 is connected to side B of hub combiner B 24.

Based on the address rules in accordance with the invention, as noted above, the addresses at the hub combiners 22, 24 would be assigned as follows. The hub combiner A would have a SLOT address of 0x511. This is because it resides in SLOT 5 of the hub-combiner shelf and is a single-sided device. The hub combiner B 24 has a SLOT address at the hub combiners of 0x711. This is because it resides in SLOT 7 of the hub shelf and is also a single-sided device. The Nodes connected to hub combiner A 22 would be assigned the following addresses with respect to the hub combiner A 22. Node A 26 would have an address of 0x5211. This is because the hub combiner A 22 resides in SLOT 5 and is a single-sided device and Node A 26 is connected to input port A (so the address bytes are 1 and 1) at a depth of 2. Node B 28 would have an address of 0x5212. This is because the hub combiner A 22 resides in SLOT 5 and is a single-sided device, the depth is 2, and Node B 28 is connected to input port B (so the address bytes are 1 and 2).

The addresses for Nodes C and D 30, 32 at the hub combiner B 24 would be assigned in a similar manner. At the hub combiner B 24, Node C 30 would be assigned an address of 0x7211. This is because the hub combiner B 24 resides in SLOT 7 of the shelf and is a single sided device, the Node C 30 is at a depth of 2, and the Node C 30 is connected to side A of the Hub combiner B 24 (so the address bytes are 1 and 1). At the hub combiner B 24, Node D 32 would be assigned an address of 0x7212. The difference in addresses between Nodes C and D is based on the fact that Node D 32 is connected to input port B of hub combiner B 24 (second address byte 2).

In order to illustrate the relative nature of the addressing system, the addresses with respect to the dual-sided receiver 20 located in SLOT 4 of the headend shelf will be describe in detail. Side A of the dual-sided receiver in SLOT 4 would be assigned an address of 0x411. This is because it resides in SLOT 4 of the modular platform and its own side A is enumerated with the value of "1". The address of SLOT B of the dual-sided receiver in SLOT 4 would be 0x412 because side B is enumerated with the value of "2" in accordance with Rule 3. Since the receiver 20 is connected to hub combiner A 22 only via the side A port, the receiver 20 would assign addresses to the hub combiner A 22 and Nodes A and B 26, 28 as follows:

At the headend receiver 20, the hub combiner A 22 is assigned an address of 0x4211. This is because the receiver 20 is in SLOT 4 of the headend shelf, the hub combiner A 22 is at a depth of 2, and the hub combiner A 22 is connected to side A of the receiver so the address bytes are 1 and 1. Node A is assigned an address of 0x43111. This is because the receiver 20 is in SLOT 4 of the headend shelf, the depth of Node A is 3, and the address bytes are 111 because the hub combiner A 22 is connected to side A of the receiver, and Node A 26 is connected to input port A of the hub combiner A 22. Node B is assigned a similar address of 0x43112 since it is connected to the input port B of the hub combiner A 22, the last address byte is 2. The depth is also 3.

With respect to the hub combiner B 24, at the headend receiver 20, it is assigned an address of 0x4221. This is because the receiver 20 resides in SLOT 4 of the headend shelf, the hub combiner B 24 is connected to side B of the receiver 20 and the depth is 2. Node C 30 is assigned an address at the headend of 0x43211. This is because the receiver 20 is in SLOT 4 of the headend shelf, the hub combiner B 24 is connected to side B of the receiver 20, and Node C is connected to input port A of the hub combiner B 24. The depth value is 3. Node D is assigned an address of 0x43212 in a similar manner. The last digit of the address is 2, because Node D 32 is connected to side B of the hub combiner B 24.

Based on the above method of assigning addresses, the address information provides topographical information for the network and a return path to the head-end platform can be meaningfully monitored at the headend, as compared to the prior known fixed address systems where the monitoring information could not be directly used until the address was looked-up. While the preferred headend is a modular platform of a cable system, the addressing system of the present invention can be applied to other types of platforms and network systems, and can be used in systems that are not modular, for example upconverters such as the C8U agile dual upconverter available from Motorola. Additionally, it is preferred that the addressing be implemented by a programable controller having instructions programmed therein for assigning addresses as noted above. However, the addressing system could also be implemented using hardware or a combination of hardware and software. Status monitoring of the platform and the devices connected to it can therefore be carried out in which the addresses convey the topology of the network. Theoretically, this addressing system would allow an infinite number of elements to be addressed and the number of layers or junctions is not fixed to a maximum number as in most non-variably assigned addressing schemes. The present method of addressing allows for variable length addresses and is very flexible to allow for system expansion without requiring rework or reassignment of existing fixed addresses while providing complete topographical information regarding the network.

What is claimed is:

1. A method of expandable network slot addressing to provide topological information for a network, comprising:
   providing a platform having addressable slots for data communication;
   providing a first tier device in at least one of the slots;
   connecting at least one second tier device to the first tier device;
   assigning an extendable address to each of the first and second tier devices, each address including a slot address segment which indicates which slot each of the devices resides in or is connected to at the modular platform, a depth segment which indicates which layer in the topology the device is located in and a number of address bytes that are present, and an address byte segment which indicates where in the topology the device is located and provides each of the devices with a unique address so that each of the devices attached to the platform can be addressed and its topological position can be inferred from the address;
   the method further comprising:
   defining the extendable address as a series of bytes; and
   representing the extendable address as <address><depth><address byte 1> . . . <address byte n>, where n is equal to a death value.

2. The method of claim 1, further comprising assigning each address based on a location of each of the devices between an addressor and an addressee device.

3. The method of claim 1, wherein the address enumeration of each of the attached devices begins with a lowest numbered port.

4. The method of claim 1, wherein the address enumeration of a multi-sided device always begins with side A or 1, and a non-multi-sided device is always enumerated as 1.

5. The method of claim 4, wherein subsequent sides of a multi-sided device are enumerated in order starting with 2.

6. The method of claim 1, wherein the address assigned to a device is dependent upon a relationship between an addressor and the addressee device.

7. The method of claim 1, further comprising:
   monitoring a return path to a headend platform using the expandable network slot address.

8. The method of claim 1, further comprising:
   connecting additional x tier devices to the x−1 tier devices, where x>2; and
   assigning each address based on a location of each of the devices relative to an addressor device.

9. The method of claim 1, wherein the modular platform is a headend modular platform of a cable-optic system.

10. A programmable controller having instructions stored therein for implementing the method of claim 1.

* * * * *